(12) United States Patent
Peterson et al.

(10) Patent No.: US 9,696,705 B2
(45) Date of Patent: Jul. 4, 2017

(54) NORMALIZED CONTROL OF AN IHS COMPONENT

(71) Applicant: Dell Products L.P., Round Rock, TX (US)

(72) Inventors: Chris Everett Peterson, Austin, TX (US); Dominick Adam Lovicott, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 180 days.

(21) Appl. No.: 14/606,308

(22) Filed: Jan. 27, 2015

(65) Prior Publication Data

US 2015/0142178 A1 May 21, 2015

Related U.S. Application Data

(63) Continuation of application No. 13/224,078, filed on Sep. 1, 2011, now Pat. No. 8,949,630.

(51) Int. Cl.
*G05B 19/042* (2006.01)
*G06F 1/26* (2006.01)
*G06F 1/20* (2006.01)

(52) U.S. Cl.
CPC ............. *G05B 19/042* (2013.01); *G06F 1/20* (2013.01); *G06F 1/26* (2013.01); *G05B 2219/49216* (2013.01)

(58) Field of Classification Search
CPC ........ G05B 19/042; G05B 2219/49216; G06F 1/26; G06F 1/20
See application file for complete search history.

(56) References Cited

U.S. PATENT DOCUMENTS

| | | |
|---|---|---|
| 3,517,509 A | 6/1970 | Bayati |
| 5,144,812 A | 9/1992 | Mills, Jr. et al. |
| 6,349,685 B1 | 2/2002 | Kolmanovsky et al. |
| 7,219,507 B1 | 5/2007 | Flachs |
| 7,583,043 B2 | 9/2009 | Chung et al. |
| 7,711,659 B2 | 5/2010 | de la Guardia et al. |
| 8,344,743 B2 | 1/2013 | Xie |
| 2009/0167228 A1 | 7/2009 | Chung et al. |
| 2011/0035606 A1 | 2/2011 | Lovicott et al. |
| 2012/0131363 A1 | 5/2012 | Hsu |
| 2013/0060350 A1 | 3/2013 | Peterson et al. |

*Primary Examiner* — M Elamin
(74) *Attorney, Agent, or Firm* — Haynes and Boone, LLP

(57) ABSTRACT

A component control system includes a component. At least one component element is included in the component. A component controller is included in the component, coupled to the at least one component element, and operable to couple to an Information Handling System (IHS) controller. The component controller is operable to receive a normalized component performance (NCP) value from the IHS controller. The NCP value is associated with at least one component output range. The component controller is also operable to provide a control signal that is associated with the NCP value to the at least one component element. In response to receiving the control signal, the at least one component element operates such that the component produces at least one component output, and each component output produced by the component is within a corresponding component output range.

20 Claims, 7 Drawing Sheets

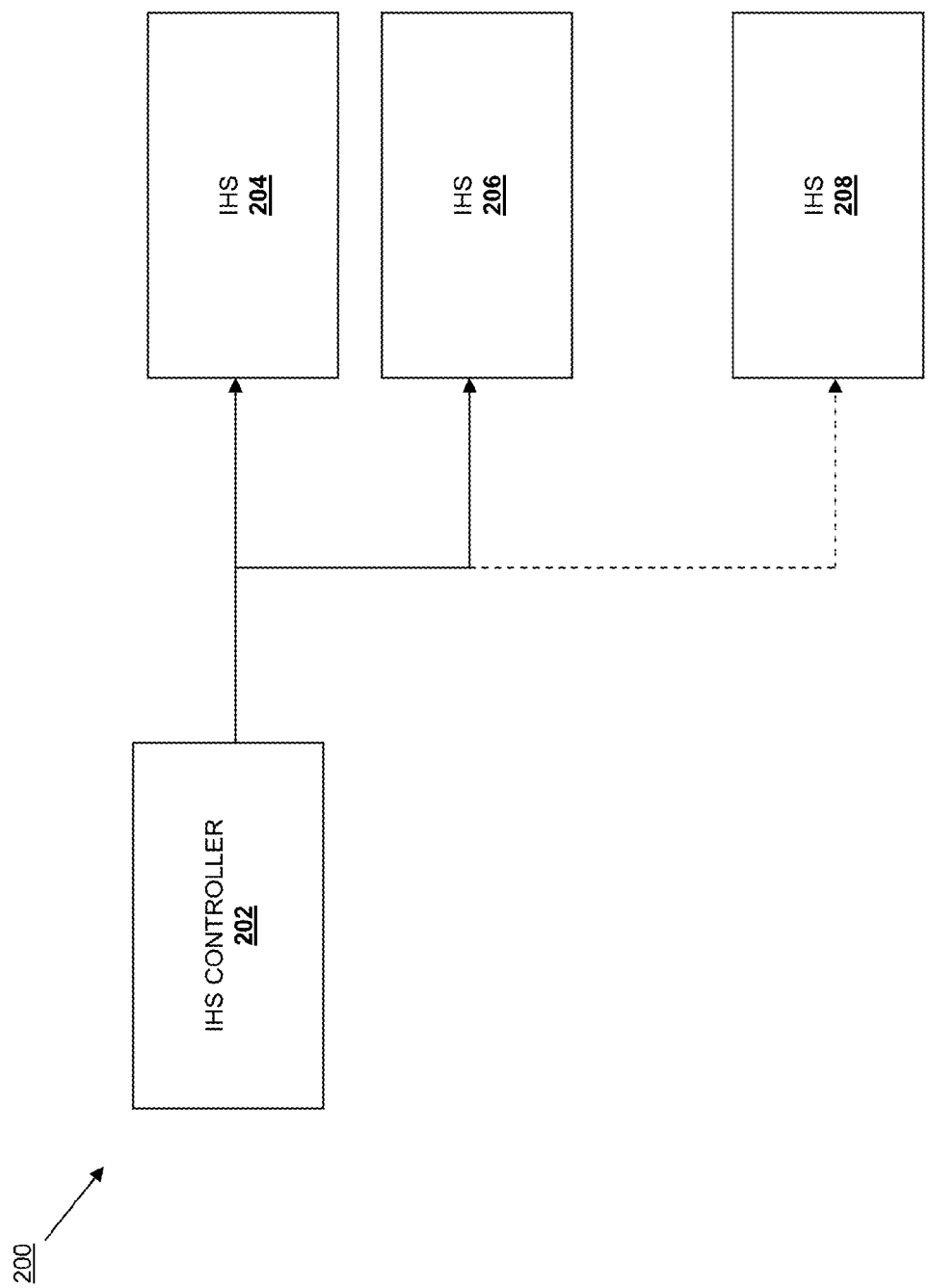

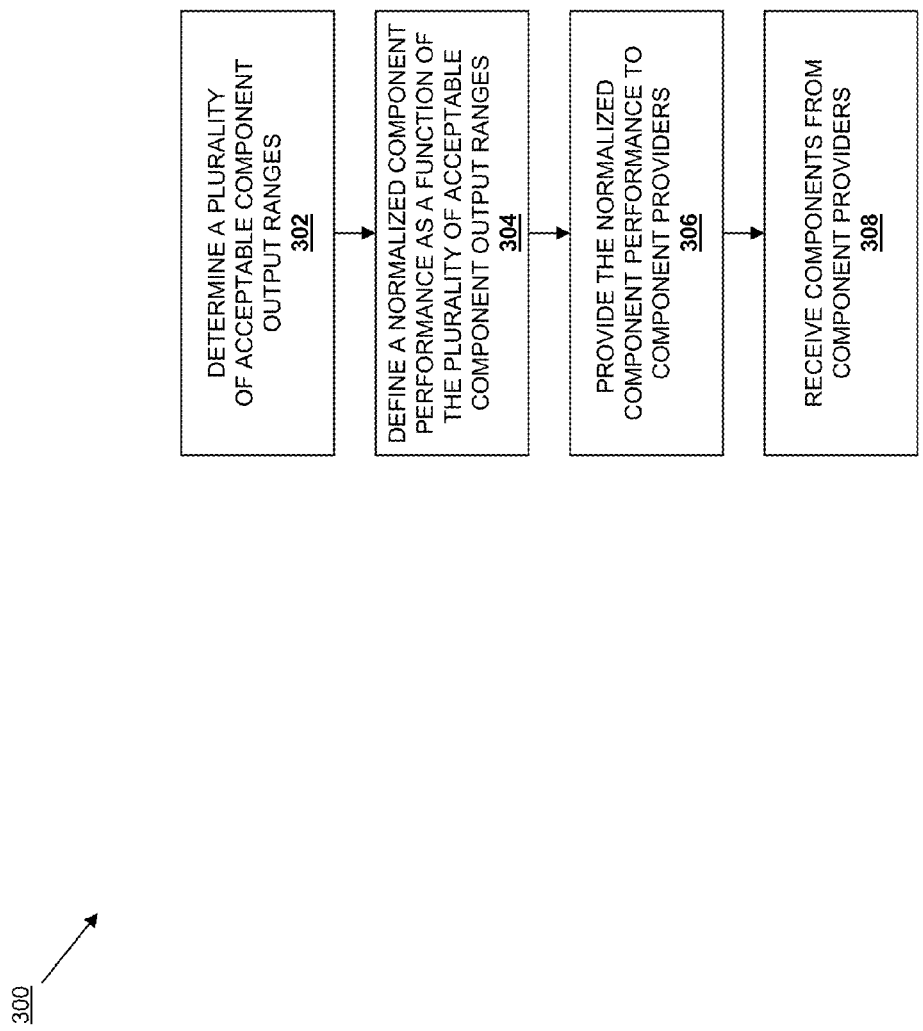

NORMALIZED CONTROL OF AN IHS COMPONENT

CROSS-REFERENCE TO RELATED APPLICATIONS

This application is a continuation of U.S. application Ser. No. 13/224,078, filed on, Sep. 1, 2011, now U.S. Pat. No. 8,949,630, which is incorporated herein by reference in their entirety

BACKGROUND

The present disclosure relates generally to information handling systems (IHSs), and more particularly to normalized control of an IHS component that achieves consistent performance from IHS components having different component elements As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHS providers may provide IHSs that include an IHS component that may be provided by a plurality of different IHS component providers (e.g., manufacturers, vendors, etc.) For example, IHSs require power supply units (PSUs), and the IHS provider may use any of a variety of PSUs provided by a plurality of different PSU providers in a given IHS. However, the use of different IHS components may result in the IHS provider needing to make restrictive and costly design choices, or provide similar IHSs that behave inconsistently from each other based on which IHS component provider provided a particular IHS component. For example, a first PSU design in an IHS may provide a different acoustical signature and/or airflow consumption than a second PSU design that is in the same IHS and that is operating under similar conditions as the first PSU design. This inconsistent behavior across IHS components operating under similar conditions and in similar IHSs may arise as a result of the areas of emphasis and/or the capabilities of the IHS component providers. For example, some PSU designs require higher pressure fans to achieve the same airflow as other PSU designs that allow the use of lower pressure fans.

Conventional solutions to this problem typically involve an IHS provider dictating specific components elements of the IHS components. For example, for PSUs, the IHS provider may dictate specific fans that may be used in the PSU. However, along with adding cost to IHS component design, such solutions can result in other negative IHS component performance aspects to the IHS component design. For example, dictating a fan for a PSU to an PSU provider may require the use of a fan in the PSU that is unnecessary for that PSU design, and may require the PSU provider to perform additional design efforts around the dictated fan that would otherwise not need to be performed. In addition, such solutions require that the IHS provider dedicate resources to the oversight of IHS components for dictated components elements.

Furthermore, the control of such IHS components can raise a number of issues. For example, PSUs include a fan controller that controls the fan(s) in the PSU during its operation. However, the IHS that includes the PSU may have the ability to override the fan controller to provide additional cooling when necessary. However, sending fan control signals (e.g., Pulse Width Modulation (PWM) signals, voltage regulation signals, RPM signals, etc.) to different PSU designs may results in a variety of different PSU outputs that are a function of the PSU design.

Accordingly, it would be desirable to provide an improved IHS component control system.

SUMMARY

According to one embodiment, a component control system includes a component, at least one component element included in the component, and a component controller that is included in the component, coupled to the at least one component element, and operable to couple to an Information Handling System (IHS) controller, wherein the component controller is further operable to receive a normalized component performance (NCP) value from the IHS controller, wherein the NCP value is associated with at least one component output range, and provide a control signal that is associated with the NCP value to the at least one component element, wherein, in response to receiving the control signal, the at least one component element operates such that the component produces at least one component output, and wherein each component output produced by the component is within a corresponding component output range.

BRIEF DESCRIPTION OF THE DRAWINGS

FIG. 2a is a schematic view illustrating an embodiment of a component control system.

FIG. 2b is a schematic view illustrating an embodiment of the component control system of FIG. 2a.

FIG. 3a is a flow chart illustrating an embodiment of a method for controlling a component.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
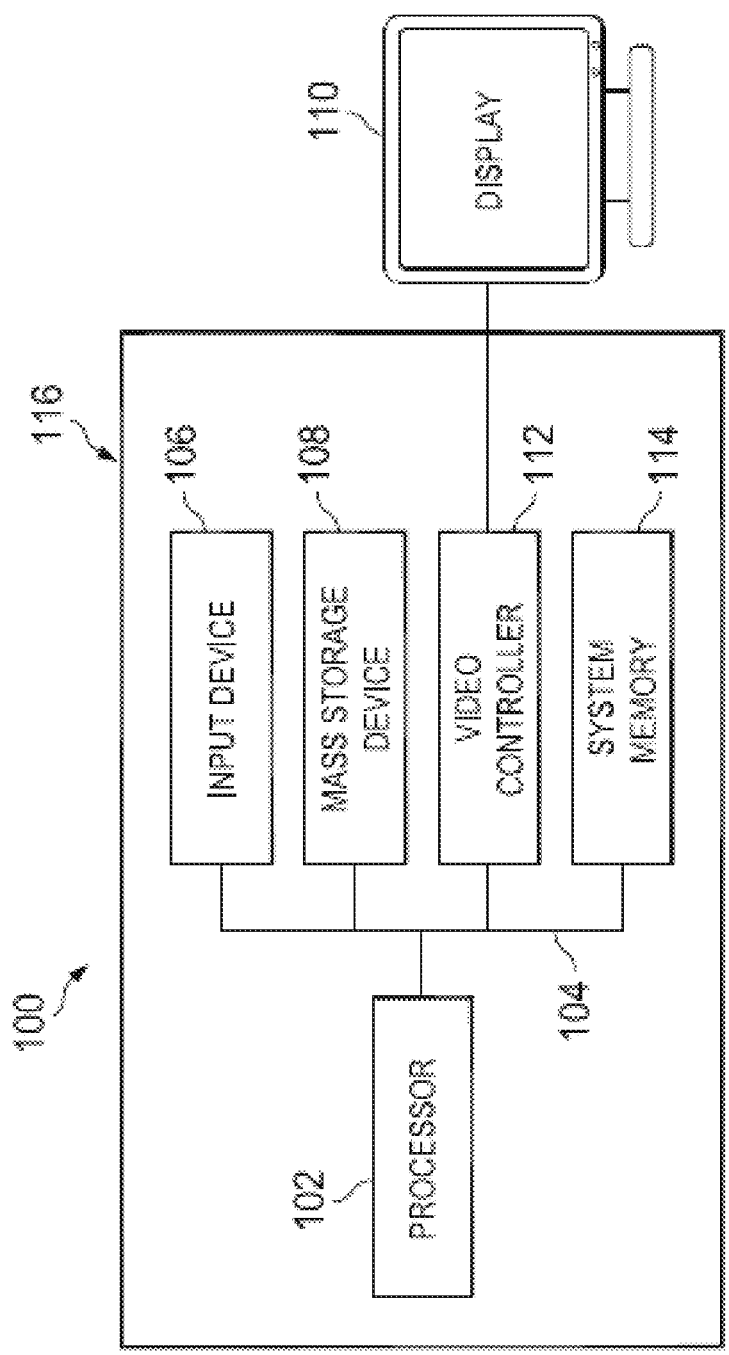
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2B:
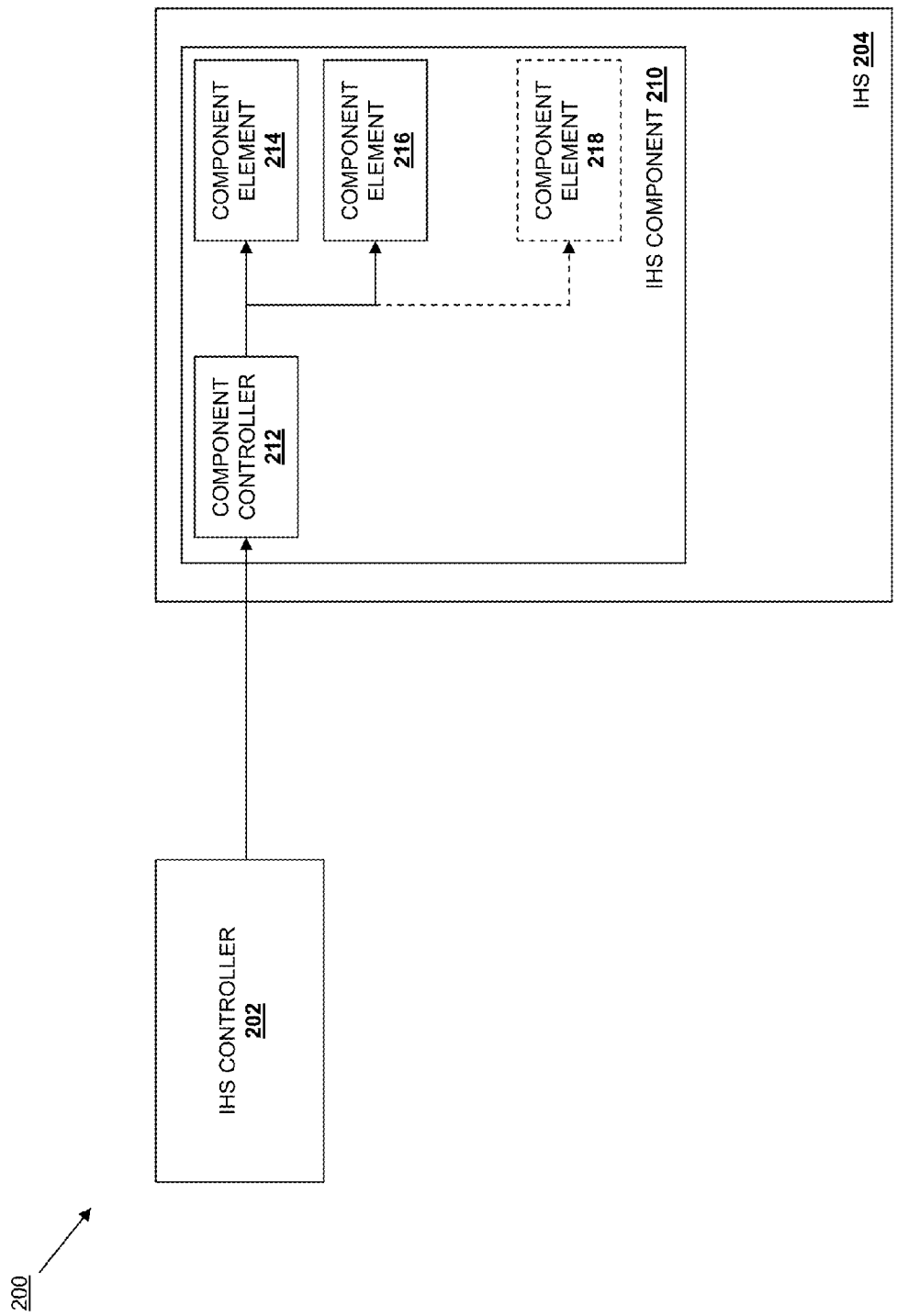

Referring now to FIGS. 2a and 2b, a component control system 200 is illustrated. The embodiment discussed below is directed to an IHS component control system, and in more specific embodiments, a Power Supply Unit (PSU) control system for an IHS. However, one of skill in the art will recognize that a variety of components other than PSUs may be controlled using the component control system 200 without departing from the scope of the present disclosure. The system 200 includes an IHS controller 202 that is coupled to a plurality of IHSs 204, 206, and 208, as illustrated in FIG. 2a. While three IHSs are illustrated, one of skill in the art will recognize that more or fewer IHSs may be coupled to the IHS controller 202 without departing from the scope of the present disclosure. In an embodiment, the IHS controller 202 may include some of the components of the IHS 100, discussed above with reference to FIG. 1. For example, the IHS controller 202 may be a remote access controller that includes its own processor, memory, network connection, and access to the system bus, and that is operable to provide out-of-band management facilities, power management, virtual media access, remote console capabilities, and/or a variety of other remote access and control capabilities known in the art. In an embodiment, any or all of the IHSs 204, 206, and 208 may be the IHS 100, discussed above with reference to FIG. 1 and may includes some or all of the components of the IHS 100. In an embodiment, the IHSs 204, 206, and 208 may be servers (e.g., blade servers) that are housed in a rack and each managed by the IHS controller 202. In another embodiment, the IHS controller 202 may be included in a single IHS.

FIG. 2b illustrates the IHS 204 of the system 200 in more detail. The IHS 204 includes an IHS component 210. In an embodiment, the IHS component 210 is housed in a chassis of the IHS 204. However, in other embodiment, the IHS component 210 may be coupled to the IHS 204 but not housed in the chassis of the IHS 204. The IHS component 210 includes a component controller 212 that is coupled to the IHS controller 202. In an embodiment, each of the IHS controller 202 and the component controller 212 are coupled to a processor (e.g., the processor 102 discussed above in FIG. 1) in the IHS 204 in order to allow the IHS controller 202 and the component controller 212 to communicate. However, one of skill in the art will recognize that the IHS controller 202 and the component controller 212 may communicate in alternative manners without departing from the scope of the present disclosure. The IHS component 210 also includes a plurality of component elements 214, 216, and 218 that are coupled to the component controller 212. While three component elements are illustrated, one of skill in the art will recognize that more or fewer component elements may be coupled to the component controller 212 without departing from the scope of the present disclosure. While only the IHS 204 is illustrated in FIG. 2b, one of skill in the art will recognize that the IHSs 206 and 208 may include an IHS component that is similar to the IHS component 210 and that operates substantially similarly in the system 200, as discussed in further detail below. Furthermore, while only one IHS component 210 has been illustrated in the IHS 204, one of skill in the art will recognize that additional IHS components (e.g., IHS components similar to the IHS component 210) may be located in the IHS 204 and coupled to the IHS controller 202 without departing from the scope of the present disclosure.

Figure 3B:
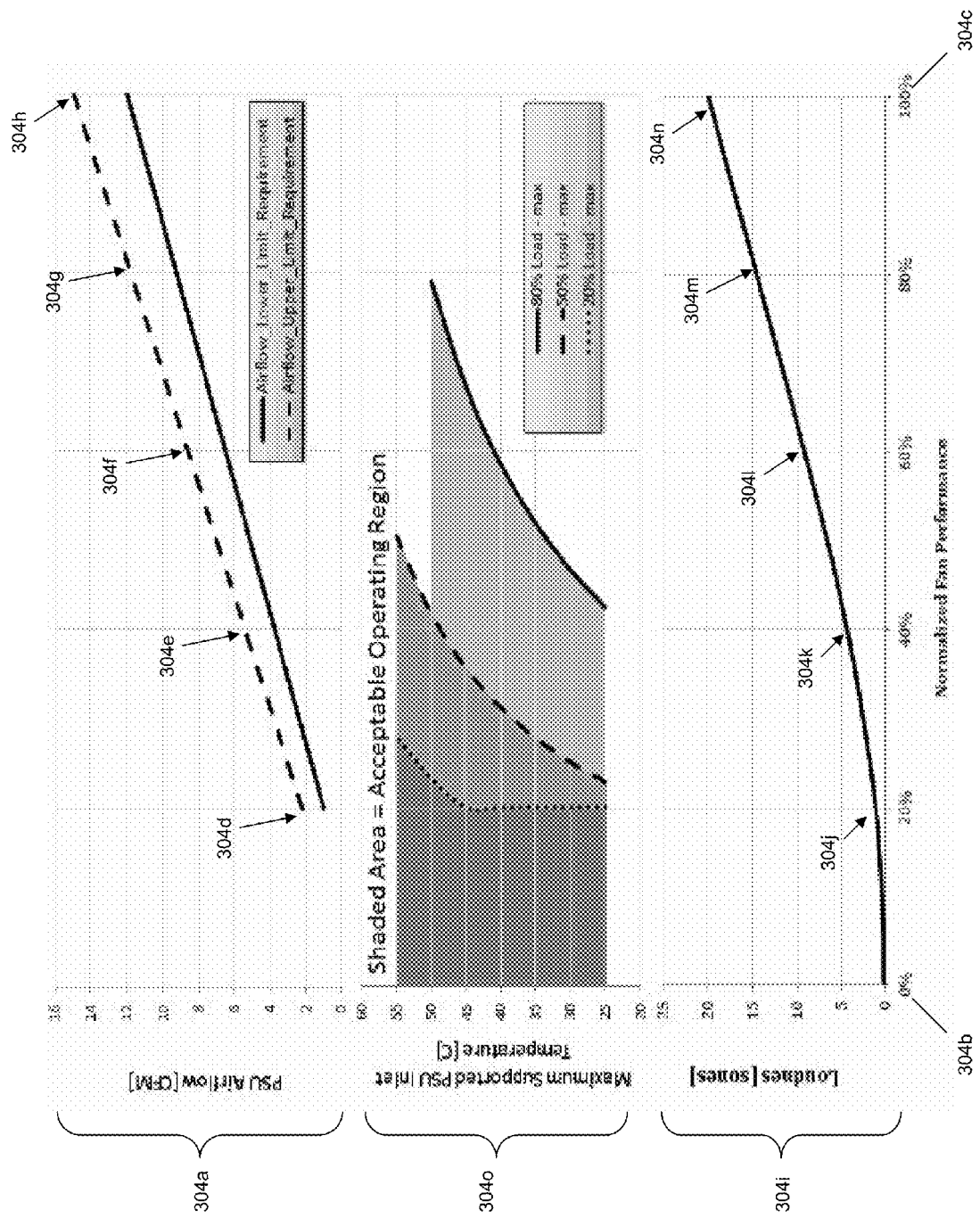
FIG. 3b chart view illustrating an embodiment of a normalized fan performance that is a function of a plurality of power supply unit input and output ranges.
Figure 3C:
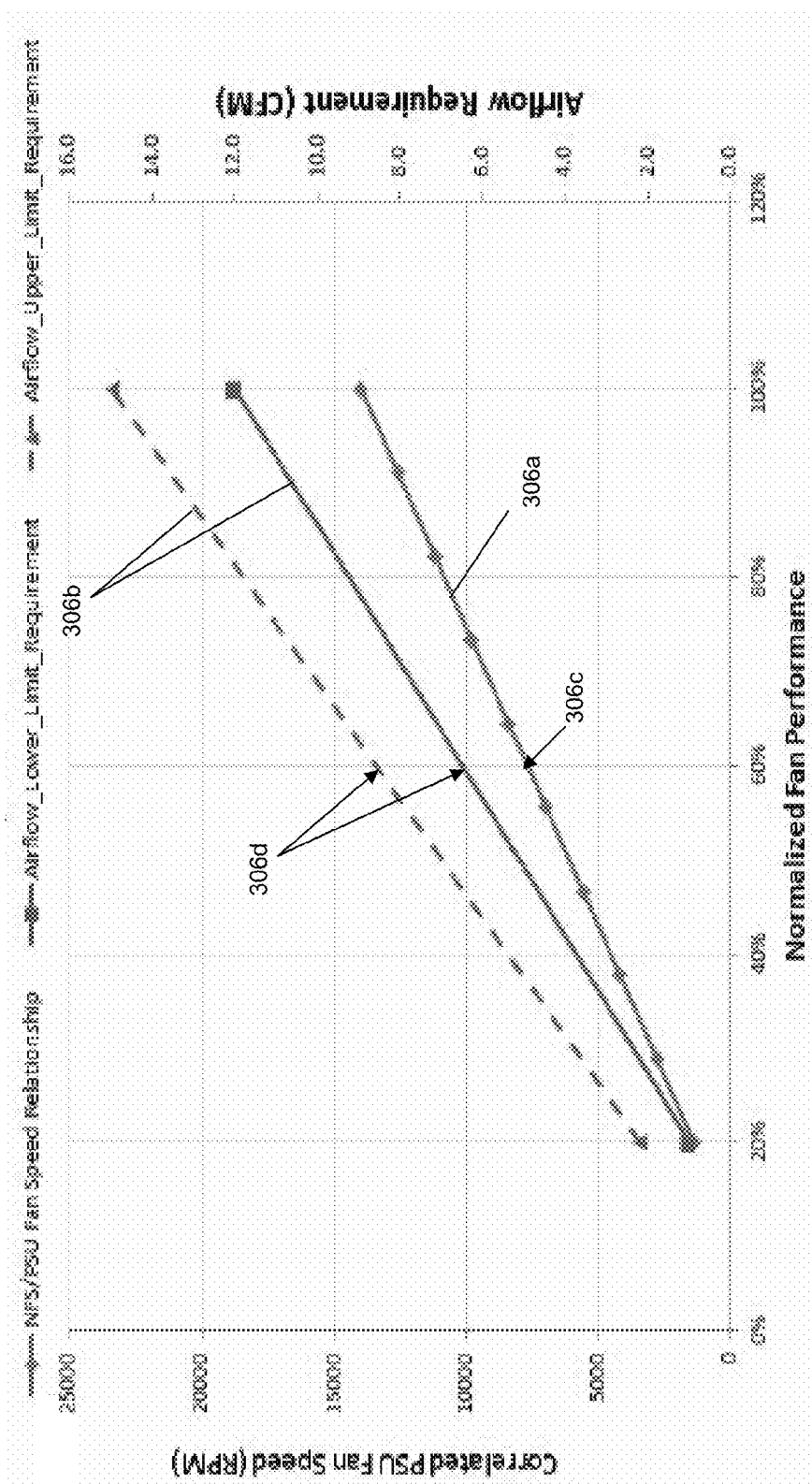
FIG. 3c is a chart view illustrating an embodiment of a normalized fan performance mapped to a fan speed that provides a power supply unit output within an acceptable airflow range.

Referring now to FIGS. 3a, 3b, and 3c, a method 300 for controlling components is illustrated. The embodiment of the method 300 described below is directed to controlling IHS components and, in more particular embodiments, to controlling a PSU in an IHS. However, one of skill in the art will recognize that a variety of components other than PSUs may be controlled using the method 300 without departing from the scope of the present disclosure. The method 300 may be performed by an IHS provider that provides IHSs that include at least one component (e.g., the IHS component 210 discussed above) that may be provided from any of a plurality of different component providers such that the design or component elements used in the component provided from a first component provider may differ from the design or component elements used in the component provided from a second component provider. The method 300 begins at block 302 where a plurality of acceptable component output ranges are determined. In the embodiment discussed below, the plurality of acceptable output ranges are determined by the IHS provider. However, one of skill in the art will recognize that other entities may determine the plurality of acceptable output ranges without departing from the scope of the present disclosure.

In one embodiment the component is a PSU, and the IHS provider may determine that the loudness output by the PSU (e.g., from sound produced by at least one fan in the PSU) should not exceed certain levels during operation of the PSU. For example, the IHS manufacturer may determine that the loudness output by the PSU should not exceed 1.5 sones during particular operating conditions, 5 sones during particular operating conditions, 10 sones during particular operating conditions, 15 sones during particular operating conditions, and 20 sones during particular operating conditions. In another embodiment, the IHS manufacturer may determine that the airflow produced through the PSU (e.g., produced by at least one fan operating in the PSU) should fall within a plurality of airflow ranges during operation of the PSU. For example, the IHS manufacturer may determine that the airflow produced through the PSU should remain between 1 and 2 cubic feet per minute (CFM) during particular operating conditions, between 4 and 5.5 CFM during particular operating conditions, between 6 and 8.5 CFM during particular operating conditions, between 9 and 12 CFM during particular operating conditions, and between 12 and 15 CFM during particular operating conditions. While a plurality of acceptable component output ranges have been described for a PSU in an IHS, one of skill in the art will recognize that a variety of other output ranges may be determined for a PSU or other component without departing from the scope of the present disclosure. For example, acceptable output ranges for a PSU may include a power consumption range, a vibration range, and/or a variety of other output ranges for PSUs known in the art. In an embodiment, an acceptable output range is a range of outputs by a component (e.g., a PSU) that allow an IHS to operate in a desired manner. For example, a desired operation of an IHS may include an IHS processor operating at a relatively high frequency, and an acceptable output range for a component may include an output of a PSU that produces an airflow through the PSU that is between 9 and 12 CFM such that the PSU is properly cooled when providing the power to the IHS processor to allow it to operate at the relatively high frequency.

The method 300 then proceeds to block 304 where a normalized component performance (NCP) is defined as a function of the plurality of acceptable component output ranges determined by the IHS provider in block 302 of the method 300. Referring to FIG. 3b, an embodiment of a NCP is illustrated for a PSU that includes at least one fan. In the embodiment illustrated in FIG. 3b, the NCP is referred to as a normalized fan performance (NFP) that is defined as a function of the acceptable PSU output ranges that are desired to result from the operation of the at least one fan. However, one of skill in the art will recognize that the NCP may be defined as a function of acceptable component outputs that are desired to result from the operation of a variety of different component elements without departing from the scope of the present disclosure.

The NFP in FIG. 3b includes an NFP airflow section 304a. The NFP airflow section 304a defines the NFP as a function of the plurality of acceptable PSU airflow ranges determined in block 302 of the method 300. As can be seen in FIG. 3b, the NFP is illustrated along the X-axis and ranges from 0% NFP at 304b to 100% NFP at 304c. The NFP has been defined at 20% to result in an airflow through the PSU between 1 and 2 cubic feet per minute (CFM) at 304d, at 40% to result in an airflow through the PSU between 4 and 5.5 CFM at 304e, at 60% to result in an airflow through the PSU between 6 and 8.5 CFM at 304f, at 80% to result in an airflow through the PSU between 9 and 12 CFM at 304g, and at 100% to result in an airflow through the PSU between 12 and 15 CFM at 304h. The NFP in FIG. 3b also includes an NFP loudness section 304i. The NFP loudness section 304i defines the NFP as a function of the plurality of acceptable PSU loudness ranges determined in block 302 of the method 300. The NFP has been defined at 20% to result in a loudness from the PSU between 0 and 1.5 sones at 304j, at 40% to result in a loudness from the PSU between 0 and 5 sones at 304k, at 60% to result in a loudness from the PSU between 0 and 10 sones at 304l, at 80% to result in a loudness from the PSU between 0 and 15 sones at 304m, and at 100% to result in a loudness from the PSU between 0 and 20 sones at 304n. Thus, for a given NFP value, an acceptable PSU airflow range and an acceptable PSU loudness range are defined for the PSU. In an embodiment, the NFP may be defined as a function of other acceptable PSU output ranges such as, for example, a PSU power consumption range, a PSU power-to-cool efficiency range, a PSU vibration range, and/or ranges for a variety of other PSU outputs known in the art. For example, an IHS provider may also define the NFP as a function of the power consumption of the PSU, with a PSU power consumption range of 3.8 to 4.2 watts at 40% NFP (along with the loudness and airflow output ranges determined at 40% NFP.)

In an embodiment, the NFP in FIG. 3b also includes an NFP input section 304o. The NFP input section 304o illustrates the association of the NFP with a PSU input range that includes a PSU inlet temperature range and a PSU load range. In an embodiment, the PSU inlet temperature range and the PSU load range are defined as inputs to the PSU that drive consistency for the desired output conditions that include the outputs illustrated in the NFP airflow section 304a and the NFP loudness section 304i/

The method 300 then proceeds to block 306 where the NCP that is defined as a function of the plurality of acceptable component output ranges is provided to the component providers. For example, the NFP discussed above that is defined as a function of the plurality of acceptable PSU output ranges is provided by the IHS provider to a plurality of PSU providers. The component providers may then design, manufacture, or otherwise provide a component using a variety of different components elements as long as the component operates within the acceptable component output ranges according to the NCP. In the embodiment directed to a PSU, a PSU provider may design, manufacture, or otherwise provide the PSU with any PSU design and component elements the PSU provider chooses (e.g., a variety of different fan types, fan sizes, fan performance capabilities, airflow restriction, thermal designs, and/or other PSU component element choices known in the art), as long as those PSU design and component elements cause the PSU to operate within the PSU output ranges according to the NFP.

In one embodiment, the PSU providers may provide the PSU by determining a PSU design and selecting PSU component elements for the PSU and then operating the PSU such that it produces a loudness output of 20 sones, which according to the NFP loudness section 304i in FIG. 3b is defined as an NFP of 100%. The PSU provider then must determine whether the PSU airflow output of that PSU is between 12 and 15 CFM (as defined for an NFP of 100% according to the NFP airflow section 304a of FIG. 3b.) If the PSU airflow output is within this PSU airflow output range, the PSU operates properly at 100% NFP. If the PSU airflow output is not within this PSU airflow output range, then the PSU provider must redesign the PSU (e.g., change the fan types, fan sizes, fan performance capabilities, airflow restriction, and/or other PSU design and/or component element choices) such that the PSU produces the PSU outputs that are within the PSU output ranges according to an NFP of 100%. Furthermore, the PSU provider must design the PSU such that all the PSU outputs that the PSU produces are within the PSU output ranges for all values of the NFP.

In another embodiment, the PSU providers may use the NFP input section 304o to design the PSU according to the NFP. In an embodiment, a PSU provider may assume that a particular PSU component performs per the requirements and use that assumption to determine how other PSU components interact with that particular PSU component. For example, instead of testing and characterizing a particular PSU, the IHS designer may refer to the requirements for that particular PSU for performance vs. NFP to predict and/or model the interactions of that particular PSU with other components in the IHS with regard to the overall functionality of the IHS.

The design of a component using the NCP may include determining a control signal to be used by the component controller 212 to cause the component elements 214, 216, and 218 to operate such that the IHS component 210 produces component outputs that are within the component output ranges according to the NCP. For example, a PSU provider may determine plurality of control signals for a fan controller that are associated with corresponding NFP values and that cause the fans to operate such that the PSU produces PSU outputs that are within the PSU output ranges according to the NFP. FIG. 3c illustrates how control signals from a fan controller may be provided to a fan to cause the fan to operate such that the PSU produces a PSU output that is within the PSU output ranges according to the NFP. FIG. 3c is a graph of fan speed and acceptable PSU airflow range vs. NFP, with fan speed on the left Y-axis, the acceptable airflow range on the right Y-axis, and the NFP on the X-axis. FIG. 3c includes a fan speed line 306a that shows the relationship between fan speed and the NFP, and a PSU airflow range 306b that shows the relationship between the acceptable PSU airflow range and the NFP. As can be seen from FIG. 3c, a control signal that is associated with an NFP of 60% may be provided by the fan controller to a fan or fans to cause the fan(s) to operate at approximately 7500 RPM (see element 306c), and the operation of the fan at 7500 RPM results in a PSU airflow that is between 6.5 and 9 CFM (see element 306d). With reference to FIG. 3b, one of skill in the art will recognize that if the component of FIG. 3c is designed properly according to the NFP, the control signal that is associated with the NFP of 60% and that causes the fan to operate at approximately 7500 RPM will provide a loudness between 0 and 10 sones (see the NFP loudness section 304i).

The method 300 then proceeds to block 308 where components are received by the IHS manufacturer. Once the component providers have designed, manufactured, and/or otherwise provided the components according to the NCP, those components may be provided to the IHS manufacturer to be included in IHSs. For example, a plurality of different PSU providers may design, manufacture, and/or otherwise provide the PSUs to the IHS manufacturer, and those PSUs many include a variety of different PSU designs and component elements (e.g., different fan types, fan sizes, fan performance capabilities, airflow restriction, and/or other PSU design and component element choices).

Figure 4:
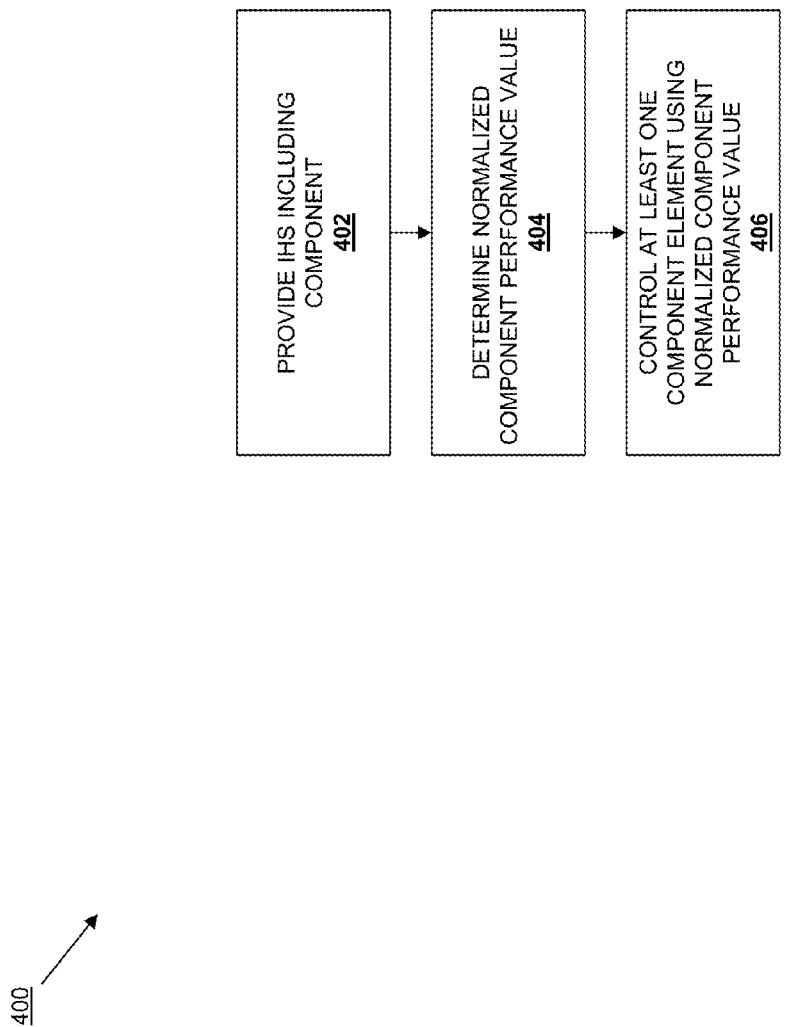
FIG. 4 is a flow chart illustrating an embodiment of a method for controlling a component.

Referring now to FIG. 4, a method 400 for controlling components 400 is illustrated. The method 400 begins at step 402 where an IHS including a component is provided. In an embodiment, the IHS 204, illustrated in FIG. 2b, is provided including the IHS component 210 having the component controller 212 coupled to the IHS controller 202 and the component elements 214, 216, and 218. The method 400 then proceeds to block 404 where an NCP value is provided to the component. During operation of the IHS 204, the IHS controller 202 may determine that the IHS component 210 should produce a component output that is within an output range, and may then determine an NCP value that will causes the component elements 214, 216, and 218 in the IHS component 210 to operate such that the IHS component 210 produces a component output that is within that output range as discussed above. For example, if the IHS component 210 is a PSU, the IHS controller 202 may determine that the fan(s) in the PSU needs to produce an airflow through the PSU that is between 9 and 12 CFM for cooling purposes. In response, the IHS controller 202 determines that the fan controller in the PSU should be provided an NFP value of 80% (se the NFP airflow section 304a.) In an embodiment, the IHS controller 202 may receive inputs such as a temperature, airflow, loudness, vibrations, power consumption, system load, stress, boundary conditions, and/or a variety of other input variables known in the art, from sensors or a system inventory in the IHS 204 in order to determine a desired component output for the PSU.

The method 400 then proceeds to block 406 where at least one component element is controlled using the NCP value. The IHS controller 202 provides the component controller 212 the NCP value determined at block 404 of the method 400, and the component controller 212 determines a control signal that is associated with that NCP value and provides that control signal to the component elements 214, 216, and 218. For example, the IHS controller 202 may provide the NFP value of 80% to the fan controller in the PSU, and the fan controller may then provide a fan control signal that is associated with the NFP of 80% to at least one fan, and that fan control signal will result in the operation of the at least one fan such that the PSU produces an airflow through the PSU that is between 9 and 12 CFM (as illustrated in the NFP airflow section 304a). Furthermore, as illustrated in FIG. 3b, the fan control signal associated with the NFP value of 80% also results in the operation of the at least one fan such that the PSU produces a PSU loudness output between 0 and 15 sones (as illustrated in the NFP loudness section 304i). In an embodiment, the operation of the PSU may produce outputs such as, for example, temperature, airflow, loudness, vibration, power consumption, and/or a variety of other outputs known in the art, that may be determined by or provided to sensors or a system inventory, and those output variables may be provided to the IHS controller 202 as feedback in a control systems loop for the PSU.

In other embodiments, the component control system may be used with a variety of other systems that includes one or more fans, systems that include servers in a data center, systems that include Graphics Processing Unit (GPU) cards, and/or a variety of other systems that include components that may be provided by different component providers and for which a consistent output is desired.

In addition, an NCP may also be provided by the IHS component to an IHS. For example, the IHS may be operable to interpret the NCP received from the IHS component (e.g., at regular polling loops) as a report of a component status and/or a response to query for a component status. One of skill in the art will recognize that an IHS may perform a number of actions known in the art in response to determining a component status through the interpretation of an NCP/NFP from that component.

Thus, a component control system has been described that allows an IHS manufacturer to define a normalized component performance (NCP) for a component that is a function of one or more component output ranges, and a plurality of different component providers may use that normalized component performance to provide the IHS manufacturer with the component that may include a variety of component elements, and any of those components may be controlled using the NFP in order to allow consistent component outputs for components even when those components include different component elements.

In an embodiment, the component control system is used with a power supply unit (PSU) in an IHS and ensures consistent performance of the PSU with regard to performance variables including airflow, loudness, power-to-cool efficiency, and/or a variety of other PSU performance variables. The IHS controller may see the PSU as a "black box" to which it provides a normalized fan performance (NFP) value, which is converted by a fan controller in the PSU to a control signal that causes the fans to operate in a desired manner, in order to cause the PSU to produce a desired output. One of skill in the art will recognize that such a methodology allows consistent performance across PSUs from different PSU providers regardless of fan choices, thermal designs, etc., as it is the desired performance of the PSU that is used to control the PSU. Furthermore, as discussed above, the NFP provides a single metric that provides a variety of different performance specifications for the PSU, and allows PSUs to be used in a variety of different IHSs (e.g., having different IHS components, different IHS structures or designs, etc.)

The component control system provides a number of substantial benefits. For example, the component control system enables a set of component output requirements that are stricter than conventional systems and methods while allowing for flexibility in component design that is greater than conventional systems and methods. The component control system also allows components output requirements to be defined independent of component providers and/or the component elements used in the component, which allows IHS providers to provide consistent customer experiences with their IHSs while also reducing the cost of providing that consistency. The component control system also reduces the complexity of component communication relative to the conventional systems and methods by using a single variable value (an NCP value), which allows components to be easily leveraged across different IHSs.

In an embodiment, the component control system provides specific benefits when applied to controlling a PSU in an IHS. Using the component control system, PSU providers may use fans with any control protocol in the PSU, including but not limited to pulse width modulation (PWM) control, voltage control, RPM signal control, and/or a variety of other control protocols known in the art. PSU providers are also free to use different capability fans to complement their PSU design strategy. For example, PSU providers may use a more capable fan to compensate for less capable thermal management in the PSU, or may use more capable thermal management to compensate for a less capable fan in the PSU. In addition, PSU providers may select fans for the PSU from a wider selection than was previously allowed, and can save time in their consideration of what fans to use in the PSU (which also saves the IHS manufacturer time and cost as well.) Furthermore, PSU providers may save cost in PSU design considerations, as they are allowed to determine which areas to invest in (e.g., based on supplier relationships, capabilities, etc.)

One of skill in the art will recognize that the use of the NFP makes discussing, writing specifications for, and implementing PSU behavior more simple than previous systems and methods. The NFP also allows PSU providers to save time in PSU design because they can design their control schemes around a single variable. The NFP also allows PSU providers to provide PSUs that work for different IHS designs because fewer variables need be considered in the PSU design, and IHS providers, in turn, may purchase PSUs in higher volumes.

Finally, the use of the NFP as a common metric in PSU behavior specifications provides for greater consistency in PSU behavior, and greater consistency in PSU behavior provides an enhanced customer experience across customers. The NFP also provides consistency across the PSU providers, which reduces the variation in thermal boundary conditions. This reduces system level PSU validation efforts and system level control requirements to accommodate varying PSU conditions. PSU consistency allows for a tighter degree of system thermal control optimization, making the IHS provider more competitive by reducing fan power and airflow consumption as well as improving customer experience through lower acoustical output.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for manufacturing a component, comprising:
   receiving, by a component provider system from an information handling system (IHS) provider system, a plurality of component output ranges for a first type of component;
   determining, by the component provider system, at least one component element for a first component that is the first type of component, wherein the at least one component element provides for operation of the first component such that the first component produces a plurality of component outputs that are each within a corresponding one of the plurality of component output ranges;
   manufacturing, by the component provider system, a plurality of the first components that each include the at least one component element; and
   providing, by the component provider system to the IHS provider system, at least one of the plurality of the first components.

2. The method of claim 1, wherein the at least one component element includes a fan system.

3. The method of claim 1, further comprising:
   determining, by the component provider system, at least one design element for the first component, wherein the at least one design element provides for operation of the first component such that the first component produces the plurality of component outputs that are each within the corresponding one of the plurality of component output ranges; and
   manufacturing, by the component provider system, a plurality of the first components that each include the at least one design element.

4. The method of claim 3, wherein the at least one design element includes a component thermal design.

5. The method of claim 1, further comprising:
   determining, by the component provider system, at least one control signal for the first component, wherein the at least one control signal provides for operation of the first component such that the first component produces the plurality of component outputs that are each within the corresponding one of the plurality of component output ranges; and manufacturing, by the component provider system, a plurality of the first components that each store the at least one control signal.

6. The method of claim 5, wherein the at least one component element includes a component controller and a controller component element, and wherein the manufacturing the plurality of the first components that each store the at least one control signal includes configuring the component controller to provide the at least one control signal to the controlled component element.

7. The method of claim 1, further comprising:
receiving, by the IHS provider system from the component provider system, the at least one of the plurality of the first components; and
manufacturing, by the IHS provider system, at least one IHS including the at least one of the plurality of the first components.

8. A method for manufacturing an information handling system (IHS), comprising:
providing, by an information handling system (IHS) provider system to a plurality of different component provider systems, a plurality of component output ranges for a first type of component;
receiving, by the IHS provider system from a first component provider system of the plurality of different component provider systems, a first component that is the first type of component and that includes at least one first component element that provides for operation of the first component such that the first component produces a plurality of first component outputs that are each within a corresponding one of the plurality of component output ranges;
receiving, by the IHS provider system from a second component provider system of the plurality of different component provider systems that is different than the first component provider system, a second component that is the first type of component and that includes at least one second component element that is different than the first component element and that provides for operation of the second component such that the second component produces a plurality of second component outputs that are each within a corresponding one of the plurality of component output ranges;
manufacturing, by the IHS provider system, a first IHS that includes the first component; and
manufacturing, by the IHS provider system, a second IHS that is different than the first IHS and that includes the second component.

9. The method of claim 8, wherein the at least one first component element includes a first fan system, and wherein the at least one second component element includes a second fan system that is different than the first fan system.

10. The method of claim 8, further comprising:
receiving, by the IHS provider system from the first component provider system, the first component that includes at least one first design element that provides for operation of the first component such that the first component produces the plurality of first component outputs that are each within the corresponding one of the plurality of component output ranges; and
receiving, by the IHS provider system from the second component provider system, the second component that includes at least one second design element that is different than the first design element and that provides for operation of the second component such that the second component produces the plurality of second component outputs that are each within the corresponding one of the plurality of component output ranges.

11. The method of claim 10, wherein the at least one first design element includes a first component thermal design, and wherein the at least one second design element includes a second component thermal design that is different than the first component thermal design.

12. The method of claim 8, further comprising:
receiving, by the IHS provider system from the first component provider system, the first component that stores at least one first control signal that provides for operation of the first component such that the first component produces the plurality of first component outputs that are each within the corresponding one of the plurality of component output ranges; and
receiving, by the IHS provider system from the second component provider system, the second component that stores at least one second control signal that is different than the first control signal and that provides for operation of the second component such that the second component produces the plurality of second component outputs that are each within the corresponding one of the plurality of component output ranges.

13. The method of claim 12, wherein the at least one first component element includes a first controlled component element and a component controller that is configured to provide the at least one first control signal to the first controlled component element, and wherein the at least one second component element includes a second controlled component element and second component controller that is configured to provide the at least one second control signal to second controlled component element.

14. A method for manufacturing a Power Supply Unit (PSU), comprising:
receiving, by a PSU provider system from an information handling system (IHS) provider system, a plurality of PSU output ranges;
determining, by the PSU provider system, at least one PSU component that provides for operation of a first PSU such that the first PSU produces a plurality of PSU outputs that are each within a corresponding one of the plurality of PSU output ranges;
manufacturing, by the PSU provider system, a plurality of the first PSUs that each include the at least one PSU component; and
providing, by the PSU provider system to the IHS provider system, at least one of the plurality of the first PSUs.

15. The method of claim 14, wherein the at least one PSU component includes a fan system.

16. The method of claim 14, further comprising:
determining, by the PSU provider system, at least one PSU design for the first PSU, wherein the at least one PSU design provides for operation of the first PSU such that the first PSU produces the plurality of PSU outputs that are each within the corresponding one of the plurality of PSU output ranges; and
manufacturing, by the PSU provider system, a plurality of the first PSUs that each include the at least one PSU design.

17. The method of claim 16, wherein the at least one PSU design includes a PSU thermal design.

18. The method of claim 14, further comprising:
determining, by the PSU provider system, at least one control signal for the first PSU, wherein the at least one control signal provides for operation of the first PSU such that the first PSU produces the plurality of PSU outputs that are each within the corresponding one of the plurality of PSU output ranges; and manufacturing, by the PSU provider system, a plurality of the first PSUs that each store the at least one control signal.

19. The method of claim 18, wherein the at least one PSU component includes a PSU component controller and a controlled PSU component, and wherein the manufacturing the plurality of the first PSUs that each include the at least one control signal includes configuring the PSU component controller to provide the at least one control signal to the controlled PSU component.

20. The method of claim 14, further comprising:

receiving, by the IHS provider system from the PSU provider system, the at least one of the plurality of the first PSUs; and manufacturing, by the IHS provider system, at least one IHS including the at least one of the plurality of the first PSUs.

\* \* \* \* \*